United States Patent
Maeda (10) Patent No.: US 8,310,565 B2
(45) Date of Patent: Nov. 13, 2012

(54) DIGITAL CAMERA WITH FACE DETECTION AND ELECTRONIC ZOOM CONTROL FUNCTION

(75) Inventor: Hirokazu Maeda, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 284 days.

(21) Appl. No.: 12/538,894

(22) Filed: Aug. 11, 2009

(65) Prior Publication Data

US 2010/0039535 A1 Feb. 18, 2010

(30) Foreign Application Priority Data

Aug. 13, 2008 (JP) ................................ 2008-208493

(51) Int. Cl.
*H04N 5/262* (2006.01)
*H04N 5/228* (2006.01)
(52) U.S. Cl. ................................. 348/240.2; 348/222.1
(58) Field of Classification Search ..... 348/240.1–240.2
See application file for complete search history.

(56) References Cited

U.S. PATENT DOCUMENTS

| | | | | |
|---|---|---|---|---|
| 5,835,641 A * | 11/1998 | Sotoda et al. | ................. | 382/291 |
| 6,507,704 B2 * | 1/2003 | Enomoto | ..................... | 396/60 |
| 7,630,527 B2 * | 12/2009 | Steinberg et al. | .............. | 382/118 |
| 7,701,491 B2 * | 4/2010 | Abe et al. | .................... | 348/240.2 |
| 7,711,258 B2 * | 5/2010 | Yanagi | ............................. | 396/88 |
| 7,720,369 B2 * | 5/2010 | Nose | ................................ | 396/77 |
| 7,778,537 B2 * | 8/2010 | Guan | ............................... | 396/60 |
| 7,852,356 B2 * | 12/2010 | Takikawa et al. | ............. | 345/660 |
| 7,912,254 B2 * | 3/2011 | Tsuji | ................................ | 382/118 |
| 8,089,527 B2 * | 1/2012 | Tomita | ......................... | 348/222.1 |
| 2005/0270399 A1 | 12/2005 | Kawaguchi et al. | | |
| 2007/0242143 A1 * | 10/2007 | Sugimoto | ................... | 348/240.2 |
| 2007/0285534 A1 * | 12/2007 | Makioka | ................... | 348/240.99 |
| 2009/0128644 A1 * | 5/2009 | Camp et al. | ................. | 348/218.1 |
| 2009/0167900 A1 * | 7/2009 | Chang et al. | .............. | 348/240.99 |
| 2009/0245770 A1 | 10/2009 | Uenaka | | |
| 2009/0245771 A1 | 10/2009 | Uenaka | | |

(Continued)

FOREIGN PATENT DOCUMENTS

JP 2005-348181 12/2005

(Continued)

OTHER PUBLICATIONS

English language Abstract of JP 2005-348181, Dec. 15, 2005.

(Continued)

*Primary Examiner* — Ngoc-Yen Vu
(74) *Attorney, Agent, or Firm* — Greenblum & Bernstein, P.L.C.

(57) ABSTRACT

A photographic apparatus comprises a monitor, a face detector, and an electronic zoom controller. The monitor displays a first through-image based on image data. The face detector performs face detection on an image of an area displayed on the monitor, based on the image data. The electronic zoom controller performs first electronic zoom control that enlarges and displays a second through-image corresponding to a predetermined area including a face area detected by the face detector, to the size of a display area of the first through-image, on the monitor. The electronic zoom controller performs second electronic zoom control that enlarges and displays an intermediate through-image corresponding to an intermediate area including the predetermined area and larger than the predetermined area, to the size of the display area of the first through-image, on the monitor, before performing the first electronic zoom control.

15 Claims, 7 Drawing Sheets

U.S. PATENT DOCUMENTS

| | | |
|---|---|---|
| 2009/0245773 A1 | 10/2009 | Uenaka |
| 2009/0245774 A1 | 10/2009 | Uenaka |
| 2009/0251551 A1 | 10/2009 | Uenaka |
| 2011/0267503 A1* | 11/2011 | Kunishige et al. ......... 348/240.1 |
| 2012/0062769 A1* | 3/2012 | Kinoshita et al. .......... 348/240.2 |

FOREIGN PATENT DOCUMENTS

| | | |
|---|---|---|
| JP | 2006-229321 | 8/2006 |
| JP | 2007-088959 | 4/2007 |
| JP | 2007-251429 | 9/2007 |

OTHER PUBLICATIONS

U.S. Appl. No. 12/538,895 to Maeda, filed Aug. 11, 2009.
U.S. Appl. No. 12/538,897 to Maeda, filed Aug. 11, 2009.
Japan Office action, dated May 15, 2012 along with an english translation thereof.

* cited by examiner

DIGITAL CAMERA WITH FACE DETECTION AND ELECTRONIC ZOOM CONTROL FUNCTION

BACKGROUND OF THE INVENTION

1. Field of the Invention

The present invention relates to a photographic apparatus and in particular to the display of a through-image by the enlargement and display of a predetermined area including an area containing a face, on the basis of face detection results.

2. Description of the Related Art

A photographic apparatus that performs face detection for the specification of a face area on an image is proposed, such as that of Japanese unexamined patent publication (KOKAI) No. 2005-348181.

In the process of the face detection, a face detector compares continuous-frame images (and in particular, designated partial face images), which vary only slightly. These frame images are called such because they are continuously displayed on the monitor. During that time, the face detector specifies the face area, i.e., it specifies the number of faces, the size of each face, their positions, etc.

When the face area is specified by such face detection, it becomes possible to enlarge and display a through-image corresponding to the area determined to include the face. Then, an image of the enlarged and displayed predetermined area can be captured, as an optimized frame for a portrait, etc.

When enlargement and display is performed, if the variations in the photographic subject image between the before and after enlargement images are large, the comparison of the continuous-frame images for specifying the face area cannot easily be performed using these images.

In such case, information regarding the face area is reset (deleted), and then, it is necessary to newly specify a face area. Therefore, the face detection is aborted during the zoom operation for enlargement and display of the through-image corresponding to the predetermined area. So, the face detection performance deteriorates in before and after enlargement/display.

SUMMARY OF THE INVENTION

Therefore, an object of the present invention is to provide a photographic apparatus that prevents deterioration of the face detection performance before and after enlargement/display of the through-image corresponding to the predetermined area including the face area.

According to the present invention, a photographic apparatus comprises a monitor, a face detector, and an electronic zoom controller. The monitor displays a first through-image based on image data. The face detector performs face detection on an image of an area displayed on the monitor, based on the image data. The electronic zoom controller performs first electronic zoom control that enlarges and displays a second through-image corresponding to a predetermined area including a face area detected by the face detector, to the size of a display area of the first through-image, on the monitor. The electronic zoom controller performs second electronic zoom control that enlarges and displays an intermediate through-image corresponding to an intermediate area including the predetermined area and larger than the predetermined area, to the size of the display area of the first through-image, on the monitor, before performing the first electronic zoom control.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings. The first embodiment will be explained first. The photographic apparatus 1 is a digital camera.

Figure 1:
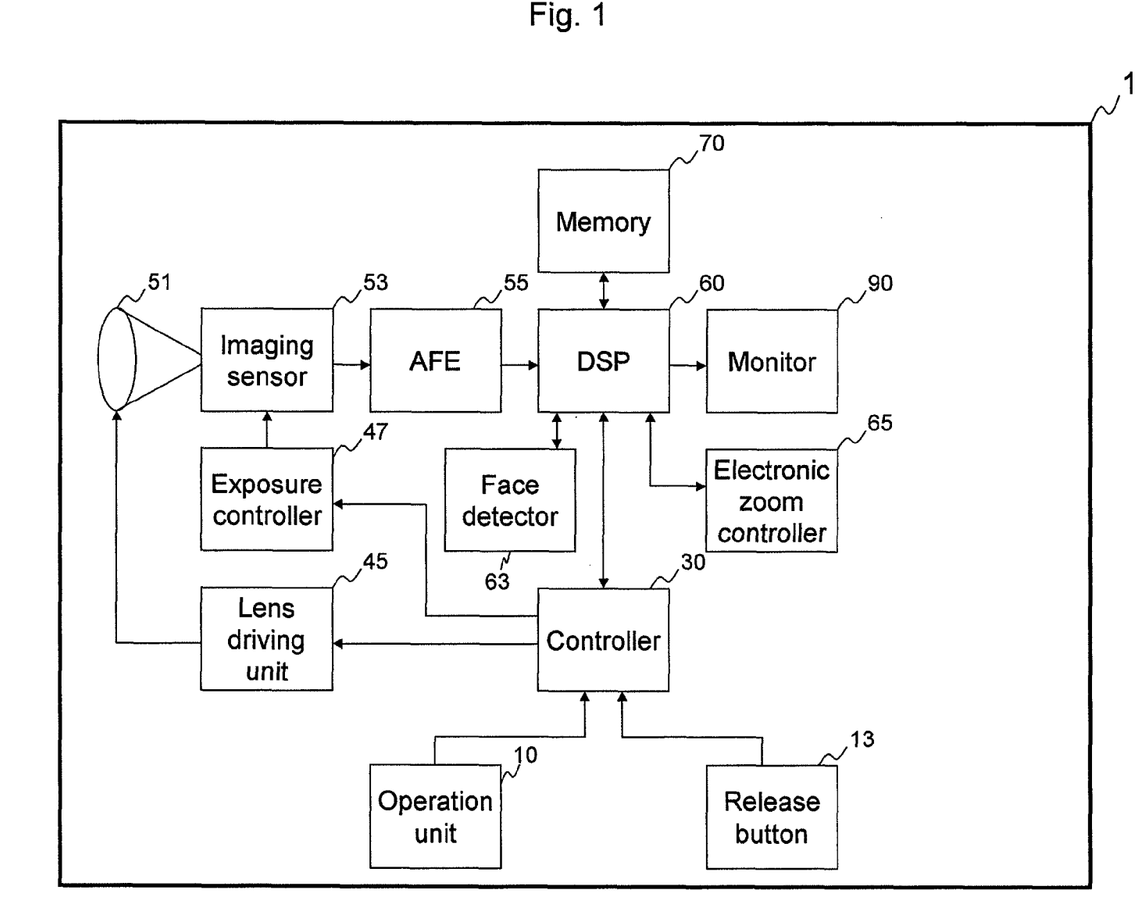
FIG. 1 is a block diagram of the photographic apparatus in the first and second embodiments.

The imaging part of the photographic apparatus 1 comprises an operation unit 10, a release button 13, a controller 30 that controls each part of the photographic apparatus 1, a lens driving unit 45, an exposure controller 47, a lens 51, an imaging sensor 53 such as a CCD, etc., an AFE (Analog Front End) 55, a DSP (an image signal-processing circuit) 60, a face detector 63, an electronic zoom controller 65, a memory 70, and a monitor 90 (see FIG. 1).

The photographic subject image is captured as an optical image through the lens 51 by the imaging sensor 53, in a photographic operation.

A/D conversion on the image data obtained by the photographic operation is performed by the AFE 55 and image-processing on the A/D converted image data is performed by the DSP 60.

The photographic operation, A/D conversion, and image-processing are performed at a predetermined time interval (for example $\frac{1}{30}^{th}$ of a second), so that a first through-image (or a second through-image) based on the image data is displayed on the monitor 90 (in a hereinafter, so-called "live view indication"; see FIG. 2).

The operation unit 10 is used for switching an imaging mode of the photographic apparatus 1 between a best framing mode and a normal imaging mode.

The best framing mode is a bust-shot mode in which frame composition is adjusted so as to shoot the bust and face of person.

When the photographic apparatus 1 is set to the best framing mode, face detection on the first through-image displayed on the monitor 90 is performed by the face detector 63. In the face detection, the size, position, etc. of face of a person in the first through-image is specified.

If face is detected by the face detection, a first frame F1 and a second frame F2 are displayed on the first through-image.

The first frame F1 indicates the detected face area. The second frame F2 indicates the framing area (a predetermined area) that includes the detected face area would be suitable as a portrait.

Figure 2:
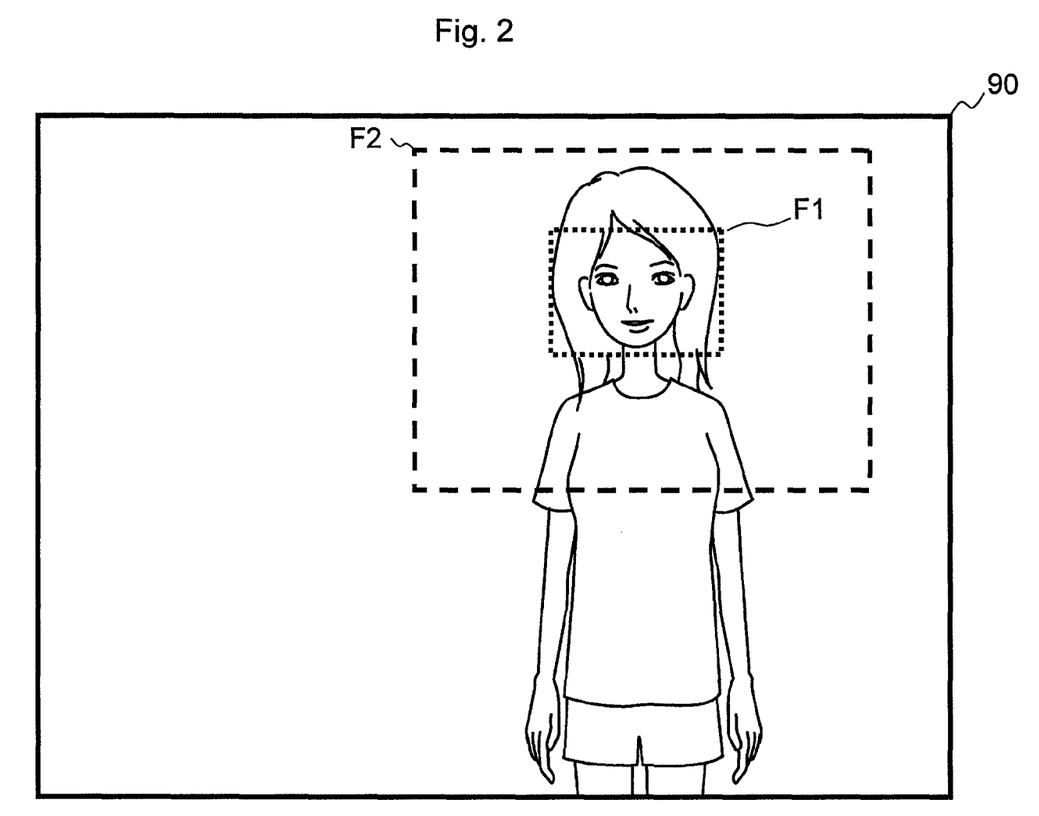
FIG. 2 shows the monitor that displays the first through-image.

In FIG. 2, the first frame F1 is shown by the dotted line, and the second frame F2 is shown by the broken line.

In the face detection, the face detector 63 compares continuous-frame images (particularly designated partial face images) whose variations in photographic subject image are small. These frame images are continuously displayed on the monitor 90. Then, the face detector 63 specifies the face area, i.e., it specifies the number of faces, the size of each face, the position of each face, etc.

The number of frames required for specifying the face area depends upon the number of faces, the size of each face (the ratio of the face area on the image), and the orientation of each face etc.

For example, when the image includes only one face area in which the face is directed towards the imaging sensor 53 and the size of this face is relatively large, the face area can be specified on the basis of about five continuous-frame images.

On the other hand, when the number of faces, the size of the face(s), and the orientation of the face(s) change, the number of frame images required for specifying a face increases.

When the variations in photographic subject image between the continuous-frame images are large, the comparison of the continuous-frame images for specifying the face area can not be performed.

For example, when the framing area changes (i.e., when zoom level is changed) after the release button 13 is partially depressed, the variations in the photographic subject image during this period are large, and consequently comparison of the continuous-frame images for specifying a face area cannot be performed.

In this case, information regarding the face area is reset (deleted), and then, it is necessary to newly specify a face area after enlargement and display of a second through-image corresponding to the framing area. Therefore, the face detection is aborted during zoom operation. Therefore, face detection performance deteriorates in this period.

When the release button 13 is partially depressed by the user, the photometric switch (not depicted) changes to the ON state so that the photometric operation is performed by an AE sensor (not depicted), and the AF sensing operation and the focusing operation based on the result of the AF sensing operation are performed by the lens driving unit 45.

The photometric operation is performed on the basis of the image data obtained in the photographic operation by the imaging sensor 53.

Specifically, the DSP 60 calculates a luminance value (i.e., information regarding the luminance of the photographic subject image) for a photometric area based on a luminance signal generated in the image processing. Then, the DSP 60 outputs that information to the controller 30 as the photometric result.

The controller 30 calculates appropriate exposure values including an aperture value and a shutter speed, on the basis of the calculated luminance value (i.e., exposure calculation).

When the release button 13 is fully depressed by the user, the release switch changes to the ON state so that the photographic operation will be performed with the exposure controller 47 controlling the aperture and shutter based on the aperture value and the shutter speed calculated by the controller 30. The captured image corresponding to the image data is displayed on the monitor 90 and the image data is stored in the memory 70.

When the photographic apparatus 1 is set to the best framing mode and when the release button 13 is partially depressed, the framing area is automatically clipped by the electronic zoom controller 65 on the basis of the result of the face detection performed at the time when the release button 13 was partially depressed.

Figure 3:
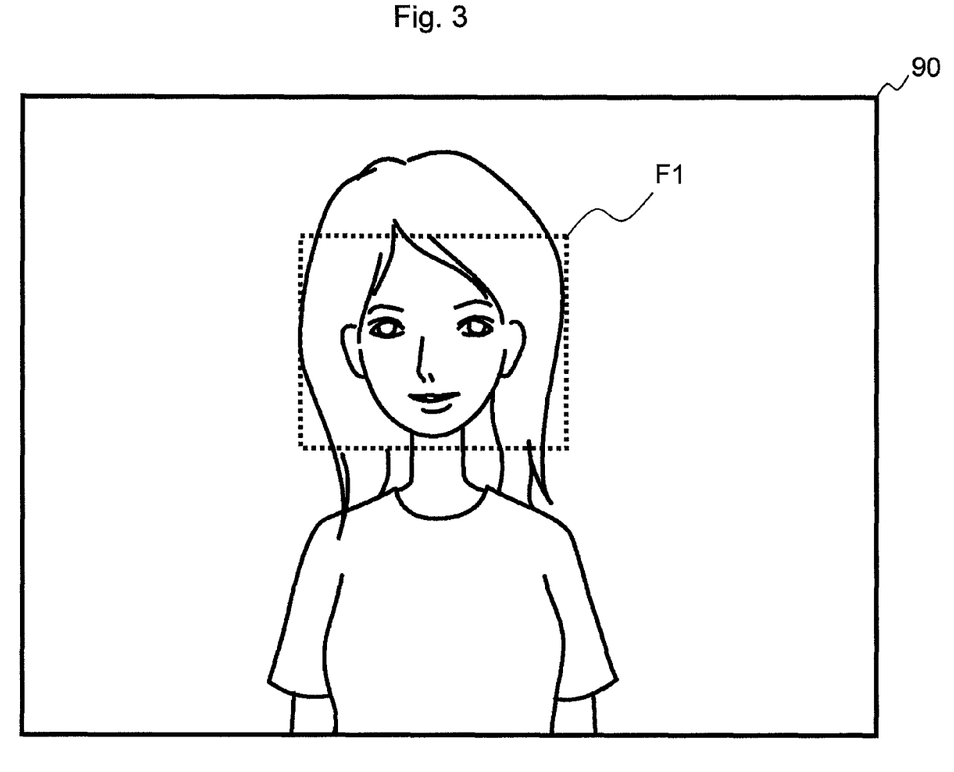
FIG. 3 shows the monitor that displays the enlarged second through-image.

The second through-image corresponding to this framing area is displayed on the monitor 90 with the second through-image being enlarged to the size of the display area of the first through-image (referred to here as "first electronic zoom control"; see FIG. 3). Enlargement and display of the second through-image is performed while the release button 13 is partially depressed.

Furthermore, a first frame F1 that shows the face area is displayed on the monitor 90, with the second through-image corresponding to the framing area enlarged and displayed on the monitor 90 (see the dotted line in FIG. 3).

The exposure calculation by the controller 30 is performed so as to optimize the exposure of the face area, and the focusing operation is performed so as to optimize the focus of the face area.

It should be noted that the face detection is also performed after partial depression of the release button 13. Therefore, the face area and the framing area change according to the movement of the photographic subject image. That is, the area, which has been enlarged and displayed on the monitor 60 as the second through-image corresponding to the framing area, changes. The position of the first frame F1 corresponding to the face area thereby changes.

In the first embodiment, second electronic zoom control(s) is/are performed by the electronic zoom controller 65, before the second through-image corresponding to the framing area is enlarged and displayed, i.e., before the first electronic zoom control is performed.

Specifically, at first, the first through-image is displayed on the monitor 90, at the time when the release button 13 is partially depressed, without the electronic zoom level being changed.

Figure 4:
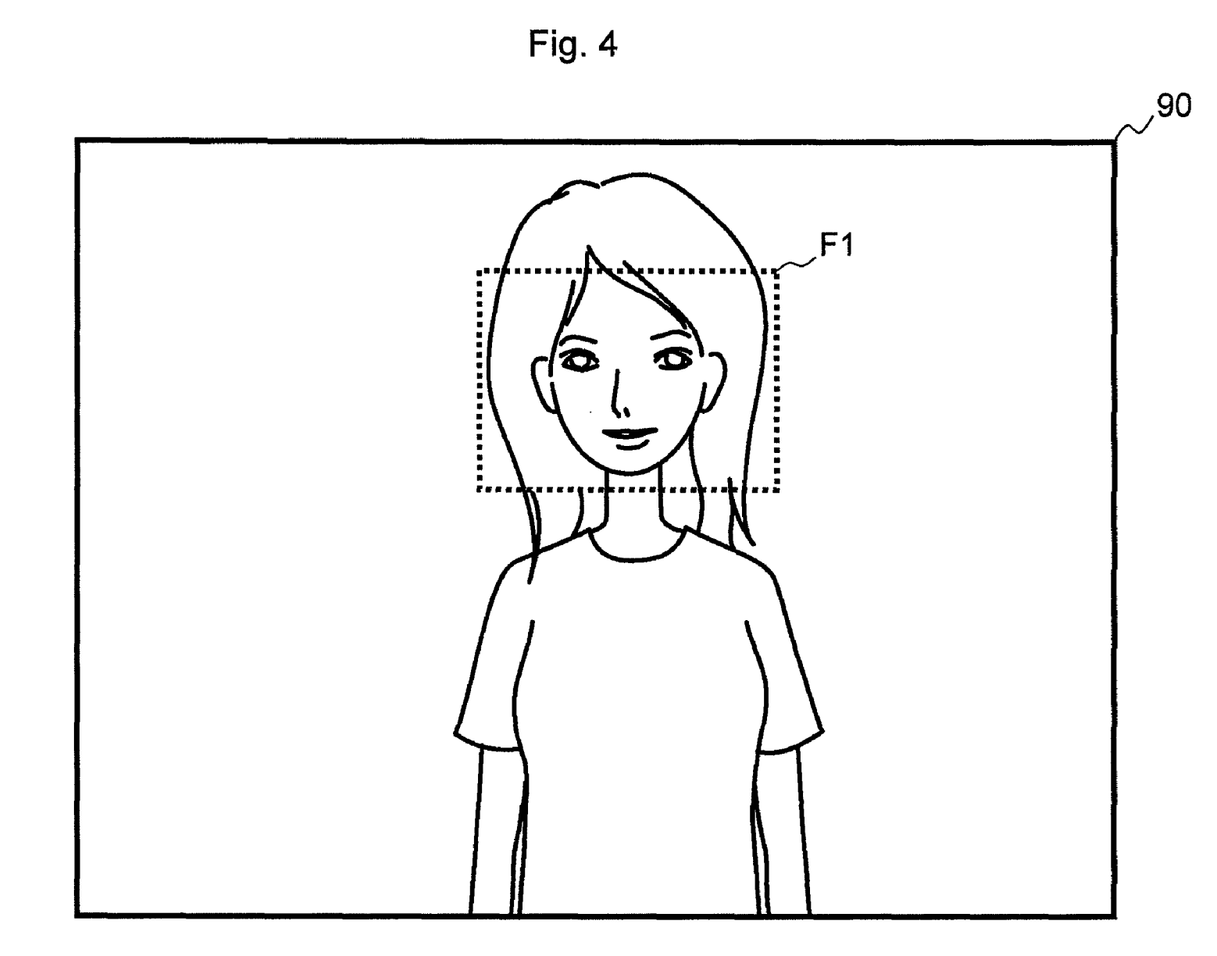
FIG. 4 shows the monitor that displays the enlarged intermediate through-image.

Then, in the second electronic zoom control, an intermediate through-image is enlarged to the size of the display area of the first through-image and displayed on the monitor 90 (see FIG. 4). The intermediate through-image corresponds to an intermediate area that includes the framing area and that is broader than the framing area.

Finally, in the first electronic zoom control, the second through-image corresponding to the framing area is enlarged to the size of the display area of the first through-image and displayed on the monitor 90.

One or more second electronic zoom control(s) to display of the intermediate through-image is/are performed, with the intermediate area being gradually narrowed.

In other words, the second electronic zoom control(s) is/are performed, with zoom-up (i.e., with increased magnification), so as to narrow the area for displaying the through-image every frame. Then, the first electronic zoom control is performed. In the first electronic zoom control, the image corresponding to only framing area is used for displaying the through-image.

Next, the details of the second electronic zoom control are explained. First, a total zoom step that is the difference between a first zoom level $Z_{initial}$ and a second zoom level $Z_{target}$, will be explained.

The first zoom level $Z_{initial}$ is the electronic zoom level (zoom step) used when the release button 13 is partially depressed so that the first through-image is displayed on the monitor 90.

The second zoom level is the electronic zoom level (zoom step) used when the second through-image corresponding to the framing area is enlarged and displayed on the monitor 90.

In the first embodiment, when the electronic zoom operation is performed once, enlarging the through-image is performed in only one zoom step. The zoom step is a predetermined unit for zooming.

One electronic zoom operation is performed every frame, so that a through-image of an area one zoom step smaller than that of the previously displayed through-image is enlarged and displayed on the monitor 90.

Accordingly, in the first embodiment, the number of total zoom steps is the equal to the number of times that the electronic zoom operations are performed to enlarge and display the second through-image.

The number of electronic zoom operations to be performed is the sum of the number of times that one or more second electronic zoom control (s) and one first electronic zoom control are performed.

After the first through-image with the first zoom level $Z_{initial}$ is displayed on the monitor 90, the electronic zoom operations are performed for zoom-up. Enlargement and display of the intermediate through-image is repeated with the electronic zoom level being changed by one zoom step, i.e., the second electronic zoom controls are performed. The area of the presently displayed intermediate through-image is smaller than the area of the previously displayed intermediate through-image by one zoom step.

Finally, the second through-image corresponding to the framing area with the second zoom level $Z_{target}$ is displayed on the monitor 90, i.e., the first electronic zoom control is performed.

An example case in which the enlargement magnification of the framing area is 2× and the total number of zoom steps is ten, is explained. In this case, the size of the framing area is half that of the display area of the first through-image, i.e., the area ratio is one quarter.

At first, the first through-image with the first zoom level $Z_{initial}$ is displayed on the monitor 90 (see FIG. 2).

Next, the first round of the second electronic zoom control is performed. Specifically, at the next frame, a through-image including the framing area, of an area one zoom step smaller than that of the first through-image, is enlarged and displayed on the monitor 90, as a first intermediate through-image.

Next, the second round of the second electronic zoom control is performed. Specifically, at the next frame, a through-image including the framing area, of an area one zoom step smaller than that of the first intermediate through-image, is enlarged and displayed on the monitor 90, as a second intermediate through-image.

Next, the third round of the second electronic zoom control is performed. Specifically, at the next frame, a through-image including the framing area, of an area one step smaller than that of the second intermediate through-image, is enlarged and displayed on the monitor 90, as a third intermediate through-image.

Next, the fourth round of the second electronic zoom control is performed. Specifically, at the next frame, a through-image including the framing area, of an area one step smaller than that of the third intermediate through-image, is enlarged and displayed on the monitor 90, as a fourth intermediate through-image.

Next, the fifth round of the second electronic zoom control is performed. Specifically, at the next frame, a through-image including the framing area, of an area one step smaller than that of the fourth intermediate through-image, is enlarged and displayed on the monitor 90, as a fifth intermediate through-image.

Next, the sixth round of the second electronic zoom control is performed. Specifically, at the next frame, a through-image including the framing area, of an area one step smaller than that of the fifth intermediate through-image, is enlarged and displayed on the monitor 90, as a sixth intermediate through-image.

Next, the seventh round of the second electronic zoom control is performed. Specifically, at the next frame, a through-image including the framing area, of an area one step smaller than that of the sixth intermediate through-image, is enlarged and displayed on the monitor 90, as a seventh intermediate through-image.

Next, the eighth round of the second electronic zoom control is performed. Specifically, at the next frame, a through-image including the framing area, of an area one step smaller than that of the seventh intermediate through-image, is enlarged and displayed on the monitor 90, as a eighth intermediate through-image.

Next, the ninth round of the second electronic zoom control is performed. Specifically, at the next frame, a through-image including the framing area, of an area one step smaller than that of the eighth intermediate through-image, is enlarged and displayed on the monitor 90, as a ninth intermediate through-image.

Next, the first electronic zoom control is performed. Specifically, at the next frame, a through-image corresponding to a framing area smaller than that of the ninth intermediate through-image by one zoom step, is enlarged and displayed on the monitor 90. In other words, the second through-image corresponding to the framing area with the second zoom level $Z_{target}$ is displayed on the monitor 90. In other words, at the tenth frame, enlargement and display of the second through-image with the total zoom step (=10) is completed.

The face detection is performed to a whole area of the image displayed on the monitor 90.

In the first embodiment, the second electronic zoom controls for enlargement and display of the intermediate through-image in incremental steps are performed, after displaying the first through-image and before performing the first electronic zoom control for enlargement and display of the second through-image.

Therefore, the variations in photographic subject image displayed on the monitor 90 between the continuous-frame images are small. So, when the second through-image is enlarged and displayed on the monitor 90, the face area can be continuously specified using the face area that has been specified before enlargement and display of the second through-image. In other words, the face area can be tracked.

When the release button 13 is fully depressed while the second through-image corresponding to the framing area is being displayed on the monitor 90 by partially depressing the release button 13, the image data corresponding to the framing area is stored in the memory 70.

Information regarding the face area as the result of the face detection is also attached to this image data.

Figure 5:
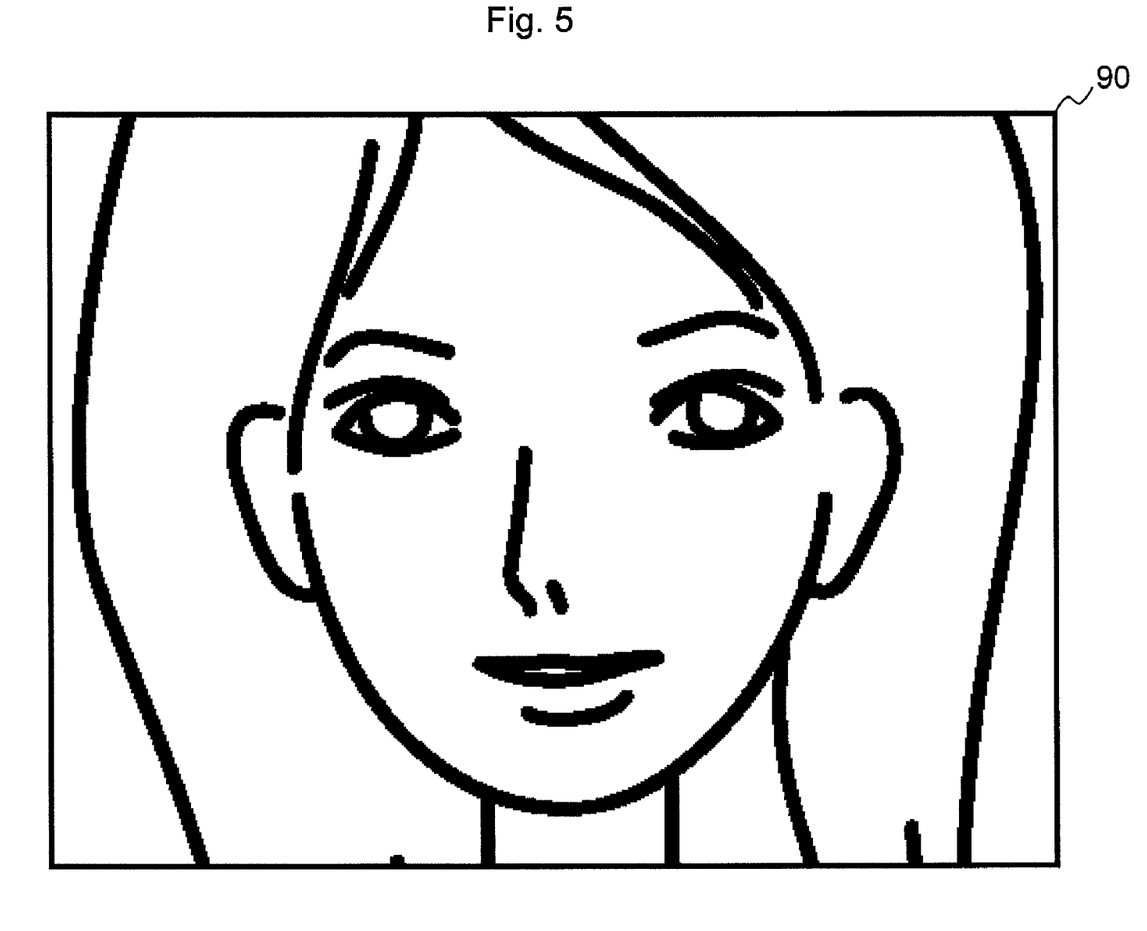
FIG. 5 shows the monitor that displays the enlarged image corresponding to the face area.

By attaching this information, the image corresponding to the face area can be further enlarged and displayed, when the image based on the image data stored in the memory 70 is reproduced (displayed) on the monitor 90 (see FIG. 5).

Following is an example case in which the second electronic zoom controls for enlargement and display of the intermediate through-image in incremental steps are not performed, after displaying the first through-image and before performing the first electronic zoom control for enlargement and display of the second through-image.

If the variations in photographic subject image displayed on the monitor 90 between the continuous-frame images are large, the comparison of the continuous-frame images for specifying the face area cannot be performed. The information regarding the face area is reset (deleted), and then it is necessary to specify a new face area (the comparison of the continuous-frame images for face detection) again after enlargement and display of a second through-image corresponding to the framing area.

In this case, immediately after the second through-image is enlarged and displayed, the continuous-frame images for comparison do not exist. Therefore, the face area cannot be specified until the predetermined continuous-frame images with only small variations, have been obtained.

Therefore, the face detection performance deteriorates during this period.

Furthermore, because the face area cannot be specified in this period, exposure control for optimizing the exposure of the face area and the focusing operation for optimizing the focus of the face area cannot be performed.

Moreover, when the release button 13 is fully depressed after enlargement and display of the second through-image and before completion of the specification of the face area, the image data corresponding to the framing area will be stored in the memory 70 without attachment of the information regarding the result of the face detection (particularly the information regarding the face area), or the image data corresponding to the framing area will be stored in the memory 70 with attachment of the information regarding the result of the face detection before enlargement and display of the second through-image.

The face area before enlargement and display of the second through-image is different from the face area after enlargement and display of the second through-image. Therefore, control for further enlargement and display of only the face area in the whole image based on the image data cannot be correctly performed on the basis of the information regarding the result of the face detection before enlargement and display of the second through-image.

However, in the first embodiment, by the second electronic zoom control(s) for enlargement and display of the intermediate through-image(s), the information regarding the face area is not reset before and after enlargement and display of the second through-image. So, the face area can be continuously specified (can be tracked) Therefore, the above described issue does not occur.

Next, the second embodiment is explained.

In the first embodiment, when the electronic zoom operation (the first or second electronic zoom control) is performed once, enlarging the through-image is performed in only one zoom step.

Specifically, one electronic zoom operation is performed every frame, so that the through-image of an area one step smaller than that of the previously displayed through-image by one zoom step is enlarged and displayed on the monitor 90.

In this case, it takes a time corresponding to the number of electronic zoom operations and corresponding to the frame rate, from when the first through-image with the first zoom level $Z_{initial}$ is displayed, to when the second through-image with the second zoom level $Z_{target}$ is enlarged and displayed.

In the first embodiment, the number of electronic zoom operations is equal to the total zoom step.

In the case in which the total zoom step is ten steps, enlargement and display of the second through-image is completed after ten of the electronic zoom operations including nine of the second electronic zoom controls and one of the first electronic zoom control.

In the second embodiment, a zoom step $\Delta z$ with which the electronic zoom operation is performed once, is adjusted.

By adjusting the zoom step $\Delta z$ so as to be greater than 1, the number of electronic zoom operations (i.e., the number of second electronic zoom controls) can be reduced as compared to the first embodiment.

After the first through image with the first zoom level $Z_{initial}$ is displayed on the monitor 90, the electronic zoom operations are performed for zoom-up. Enlargement and display of the intermediate through-image is repeated with the electronic zoom level being changed with the zoom step $\Delta z$, i.e., the second electronic zoom controls are performed. The area of the presently displayed intermediate through-image is smaller than the area of the previously displayed intermediate through-image with the zoom step $\Delta z$.

Finally, the second through-image corresponding to the framing area with the second zoom level $Z_{target}$ is displayed on the monitor 90, i.e., the first electronic zoom control is performed.

If the zoom step $\Delta z$ is set to greater than 1, the number of electronic zoom operations is less than the total zoom step.

Specifically, the zoom step $\Delta z$ ($\geqq 1$) is calculated, on the basis of the size, orientation, etc., of the face specified by the face detection and the total zoom step, under the condition where the variations in photographic subject image displayed on the monitor 90 between the continuous-frame images are sufficiently small so as to permit to continuous specification (tracking) of the face area. This condition will be referred to in the following examples.

An example case in which the face specified by the face detection is relatively large and the face is directed towards the imaging sensor 53 is given next. In this example, the face area can be tracked (continuously specified), even if the number of frames is set to low and the variations in photographic subject image displayed on the monitor 90 between the continuous-frame images are relatively large.

Therefore, the above described condition can be easily satisfied, even if the number of second electronic zoom controls is set to low.

Accordingly, the zoom step $\Delta z$ can be set high. For example, when the zoom step $\Delta z$ is set to 4, at first, the first through-image with first zoom level $Z_{initial}$ is displayed on the monitor 90 (see FIG. 2).

Next, the first round of the second electronic zoom control is performed. Specifically, at the next frame, a through-image including the framing area, of an area four zoom steps smaller than that of the first through-image, is enlarged and displayed on the monitor 90, as a first intermediate through-image.

Next, the second round of the second electronic zoom control is performed. Specifically, at the next frame, a through-image including the framing area, of an area four zoom steps smaller than that of the first intermediate through-image, is enlarged and displayed on the monitor 90, as a second intermediate through-image.

Next, the first electronic zoom control is performed. Specifically, at the next frame, a through-image corresponding to the framing area smaller than that of the second intermediate through-image by two zoom steps, is enlarged and displayed on the monitor 90. In other words, the second through-image corresponding to the framing area with the second zoom level $Z_{target}$ is displayed on the monitor 90.

Thus, enlargement and display of the second through-image is completed after three of the electronic zoom operations including two of the second electronic zoom controls and one of the first electronic zoom control. In other words, at the third frame, enlargement and display of the second through-image with the total zoom step (=10) is completed.

An example case in which the face specified by the face detection is relatively small and the face is directed to the side is explained. In this case, in order to track (i.e., continuously specify) the face area, the number of frames should be set low so that the variations in photographic subject image displayed on the monitor 90 between the continuous-frame images should be relatively small.

Therefore, it will be hard to satisfy the above described condition when the number of second electronic zoom controls is set low.

Accordingly, the zoom step Δ z can be set low. For example when the zoom step Δ z is set to 2, at first, the first through-image with the first zoom level $Z_{initial}$ is displayed on the monitor 90 (see FIG. 2).

Next, the first round of the second electronic zoom control is performed. Specifically, at the next frame, a through-image including the framing area, of an area two zoom steps smaller than that of the first through-image, is enlarged and displayed on the monitor 90, as a first intermediate through-image.

Next, the second round of the second electronic zoom control is performed. Specifically, at the next frame, a through-image including the framing area, of an area two zoom steps smaller than that of the first intermediate through-image, is enlarged and displayed on the monitor 90, as a second intermediate through-image.

Next, the third round of the second electronic zoom control is performed. Specifically, at the next frame, a through-image including the framing area, of an area two zoom steps smaller than that of the second intermediate through-image, is enlarged and displayed on the monitor 90, as a third intermediate through-image.

Next, the fourth round of the second electronic zoom control is performed. Specifically, at the next frame, a through-image including the framing area, of an area two zoom steps smaller than that of the third intermediate through-image, is enlarged and displayed on the monitor 90, as a fourth intermediate through-image.

Next, the first electronic zoom control is performed. Specifically, at the next frame, a through-image corresponding to the framing area smaller than that of the fourth intermediate through-image by two zoom steps, is enlarged and displayed on the monitor 90. In other words, the second through-image corresponding to the framing area with the second zoom level $Z_{target}$ is displayed on the monitor 90.

Thus, enlargement and display of the second through-image is completed after five of the electronic zoom operations including four of the second electronic zoom controls and one of the first electronic zoom control. In other words, at the fifth frame, enlargement and display of the second through-image with the total zoom step (=10) is completed.

Therefore, enlargement and display of the second through-image corresponding to the framing area, i.e., the first electronic zoom control can be rapidly performed, with the tracking of the face area, by restricting the variations in the photographic subject image displayed on the monitor 90 between the continuous-frame images.

Figure 6:
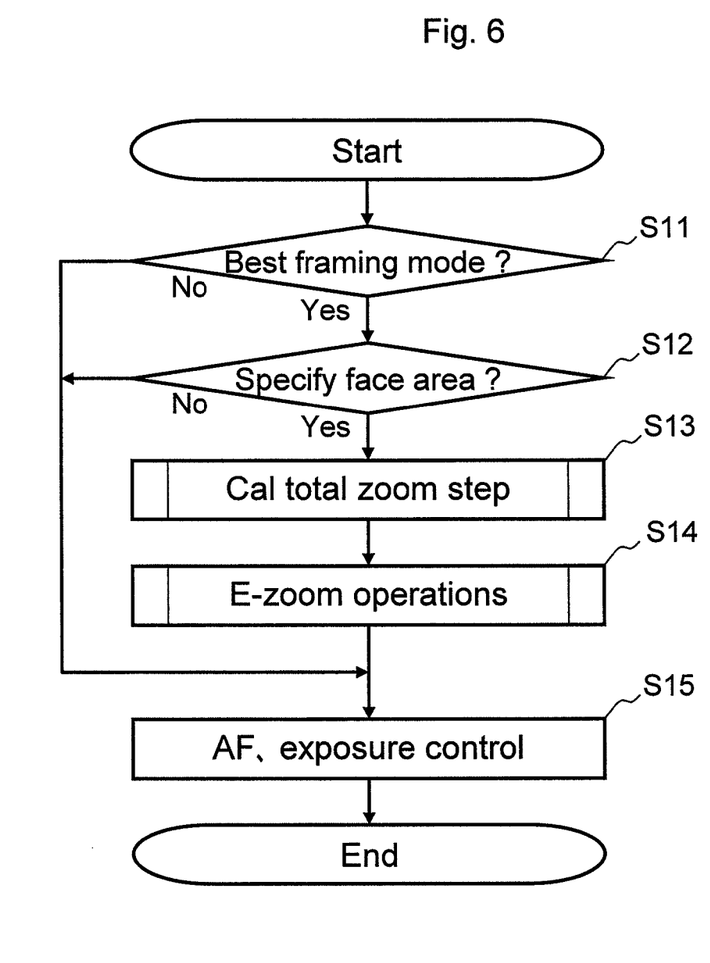
FIG. 6 is a flowchart that shows a process including the AF sensing operation after partial depression of the release button.

Next, the process including the AF sensing operation etc., after the release button 13 is partially depressed, is explained using the flowchart of FIG. 6. It should be noted that the face detection is performed in parallel. When the face area is specified as a result of the face detection, the first frame F1 that indicates the specified face area and the second frame F2 that indicates the framing area are displayed in the first through-image.

When the release button 13 is partially depressed, in step S11 it is determined whether the photographic apparatus 1 is set to the best framing mode. When it is determined that the photographic apparatus 1 is set to the best framing mode, the operation continues to step S12, otherwise, the operation proceeds to step S15.

In step S12, it is determined whether the face area is to be specified in the face detection that is performed in parallel.

When it is determined that the face area is to be specified, the operation continues to step S13, otherwise, the operation proceeds to step S15.

In step S13, the total zoom step, which is the difference between the first zoom level $Z_{initial}$ and the second zoom level $Z_{target}$, is calculated.

In step S14, on the basis of the total zoom step, enlargement and display of the second through-image corresponding to the framing area is performed in incremental steps (the electronic zoom operations).

The details of the electronic zoom operations are described later using the flowchart of FIG. 7.

In step S15, for the enlarged and displayed second through-image, the exposure control for optimizing the exposure of the face area by the controller 30 and the focusing operation for optimizing the focus of the face area by the lens driving unit 45 are performed.

Figure 7:
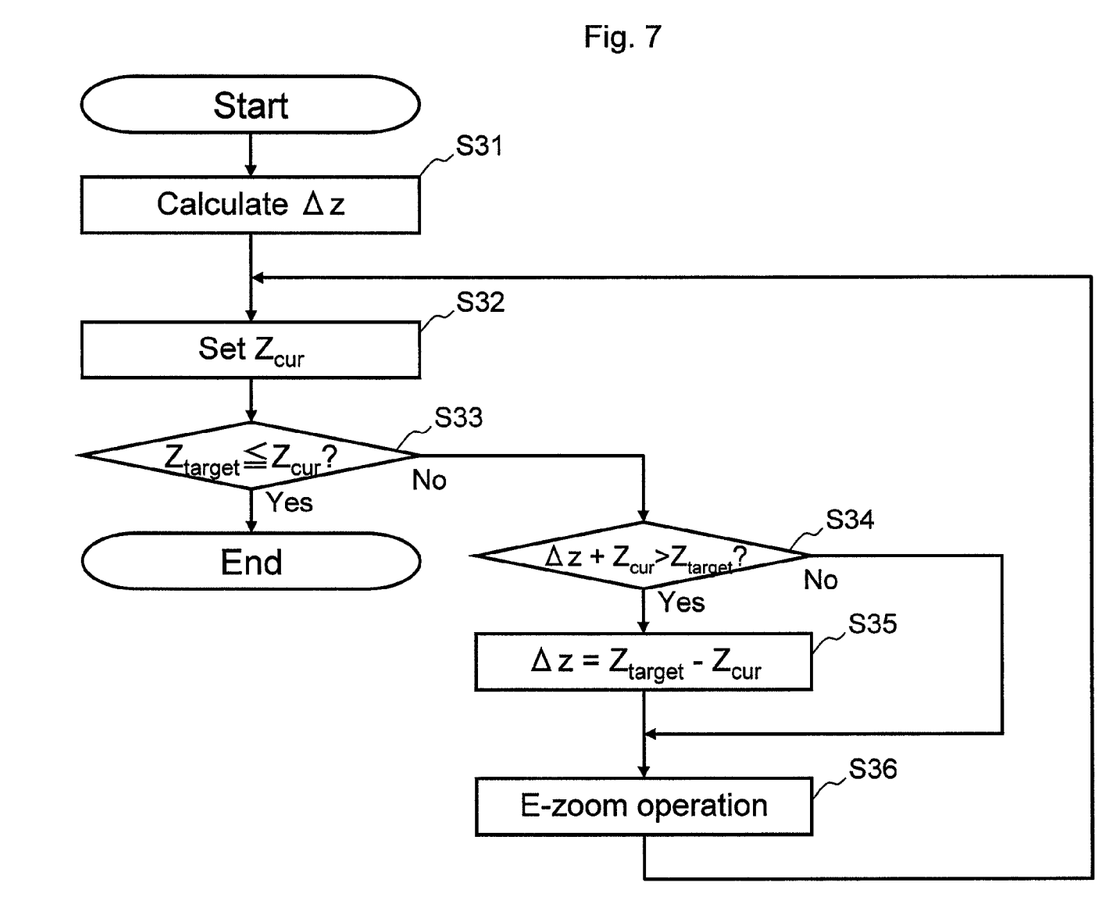
FIG. 7 is a flowchart that shows the process of the electronic zoom operations.

Next, the details of the electronic zoom operations in step S14 are explained using the flowchart of FIG. 7.

In step S31, the zoom step Δ z is calculated on the basis of the total zoom step calculated in step S13, the size of the face in the face area specified by the face detection, etc.

In step S32, the current zoom step of the presently displayed through-image on the monitor 90 is set to a zoom level parameter $Z_{cur}$.

Specifically, when the first through-image is displayed on the monitor 90, the first zoom level $Z_{initial}$ is set to the zoom level parameter $Z_{cur}$.

When the intermediate through-image is enlarged and displayed on the monitor 90, a zoom level for the enlarged and displayed intermediate through-image is set to the zoom level parameter $Z_{cur}$.

When the second through-image is enlarged and displayed on the monitor 90, the second zoom level $Z_{target}$ is set to the zoom level parameter $Z_{cur}$.

In step S33, it is determined whether the second zoom level $Z_{target}$ is less than or equal to the zoom level parameter $Z_{cur}$.

When it is determined that the second zoom level $Z_{target}$ is less than or equal to the zoom level parameter $Z_{cur}$, the electronic zoom operations are finished because enlargement and display of the second through-image is then complete, i.e., the first electronic zoom control is complete.

Otherwise, the operation continues to step S34 because enlargement and display of the intermediate through-image or the first through-image is being performed at this time.

In step S34, it is determined whether a sum of the zoom level parameter $Z_{cur}$ and the zoom step Δ z is greater than the second zoom level $Z_{target}$.

When it is determined that the sum is greater than the second zoom level $Z_{target}$, the operation continues to step S35, otherwise, the operation proceeds to step S36.

In step S35, the difference between the second zoom level $Z_{target}$ and the zoom level parameter $Z_{cur}$ is set to the zoom step Δ z.

In step S36, the electronic zoom operation is performed once.

In other words, the intermediate through-image (or the second through-image), with an area Δ z zoom steps smaller than that of the presently displayed through-image, is enlarged and displayed on the monitor 90.

Then, the operation returns to step S32.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2008-208493 (filed on Aug. 13, 2008), which is expressly incorporated herein by reference, in its entirety.

The invention claimed is:

1. A photographic apparatus comprising:
a monitor that displays a first through-image based on image data;
a face detector that performs face detection on an image of an area displayed on said monitor, based on said image data; and
an electronic zoom controller that performs first electronic zoom control that enlarges and displays a second through-image, corresponding to a predetermined area including a face area detected by said face detector, to the size of a display area of said first through-image, on said monitor;
said electronic zoom controller performing second electronic zoom control that enlarges and displays an intermediate through-image corresponding to an intermediate area, said intermediate area being larger than and including said predetermined area, to the size of said display area of said first through-image, on said monitor, before performing said first electronic zoom control, a magnification of the second through image being determined before said electronic zoom controller performs the first electronic zoom control, a magnification of the intermediate through image being determined based upon a magnification ratio of the second through image to the first through image.

2. The photographic apparatus according to claim 1, wherein a number of operations of said second electronic zoom control is determined on the basis of a result of said face detection.

3. The photographic apparatus according to claims 2, wherein said result of said face detection includes size and orientation information of a detected face.

4. The photographic apparatus according to claim 1, wherein a zoom step, by which a single operation of said second electronic zoom control is performed, is adjusted on the basis of a result of said face detection.

5. The photographic apparatus according to claim 4, wherein said result of said face detection includes size and orientation information of a detected face.

6. The photographic apparatus according to claim 1, said electronic zoom controller performing one first electronic zoom control operation and at least one second electronic zoom control operation, and further comprising a determiner that determines a number of second electronic zoom control operations that the electronic zoom controller performs, based upon a difference between an initial magnification, of the first through image, and a target magnification, of the second through image.

7. The photographic apparatus according to claim 1, said electronic zoom controller being configured to perform said first electronic zoom control and said second electronic zoom control such that information regarding the detected face area is retained in said second through image.

8. The photographic apparatus according to claim 1, wherein a number of electronic zoom operations performed, from the first through image, at an initial magnification, to the second through image, at a target magnification, is equal to one more than a number of second electronic zoom control operations.

9. The photographic apparatus according to claim 1, wherein the second electronic zoom control is performed for each frame of the image.

10. The photographic apparatus according to claim 1, wherein a plurality of second electronic zoom control operations are performed, such that the intermediate area for each second electronic zoom control operation becomes successively smaller by one zoom step, until the second through image is displayed.

11. The photographic apparatus according to claim 1, wherein one or more second electronic zoom control operations are performed at zoom intervals corresponding to an integer multiple of a number of zoom steps between the first through image and the second through image.

12. The photographic apparatus according to claim 1, wherein enlargement and display of the second through image is completed after a number of frames equal to one more than a number of second electronic zoom control operations.

13. The photographic apparatus according to claim number 1, wherein a number of zoom steps per second electronic zoom control is non-uniform.

14. The photographic apparatus according to claim 1, wherein, when a face is detected by said face detector, a first frame indicating the detected face area, and a second frame indicating a framing area which is suitable for a portrait, are displayed on the first through image.

15. The photographic apparatus according to claim 1, wherein one or more second electronic zoom control operations are performed by said electronic zoom controller before the second through image is enlarged and displayed.

* * * * *